No. 818,166. PATENTED APR. 17, 1906.
W. HARTMANN.
VALVE GEAR.
APPLICATION FILED JUNE 2, 1904.

3 SHEETS—SHEET 1.

WITNESSES:
W. M. Avery
A. H. Davis

INVENTOR
Wilhelm Hartmann
BY
ATTORNEYS

No. 818,166. PATENTED APR. 17, 1906.
W. HARTMANN.
VALVE GEAR.
APPLICATION FILED JUNE 2, 1904.
3 SHEETS—SHEET 2.
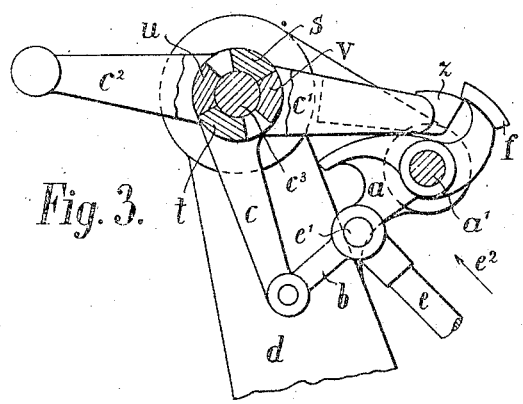
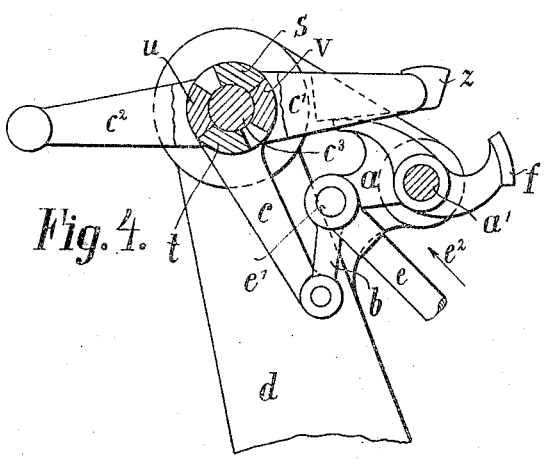
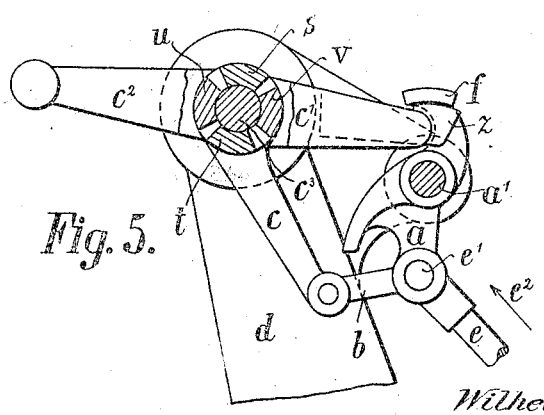
WITNESSES:
INVENTOR
Wilhelm Hartmann
BY
ATTORNEYS No. 818,166. PATENTED APR. 17, 1906.
W. HARTMANN.
VALVE GEAR.
APPLICATION FILED JUNE 2, 1904.

3 SHEETS—SHEET 3.

WITNESSES:
W. M. Avery
A. H. Davis

INVENTOR
Wilhelm Hartmann
BY
ATTORNEYS

UNITED STATES PATENT OFFICE.

WILHELM HARTMANN, OF BERLIN, GERMANY.

VALVE-GEAR.

No. 818,166.   Specification of Letters Patent.   Patented April 17, 1906.

Application filed June 2, 1904. Serial No. 210,826.

*To all whom it may concern:*

Be it known that I, WILHELM HARTMANN, a subject of the German Emperor, and a resident of Berlin, Germany, have invented a new and Improved Valve-Gear, of which the following is a full, clear, and exact description.

The invention relates to valve-gears for use on steam-engines, gas-engines, and other motors.

The object of the invention is to provide a new and improved valve-gear which is positive in its action, requiring comparatively little working power, and arranged to prevent undue influence on the governor by back strains.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
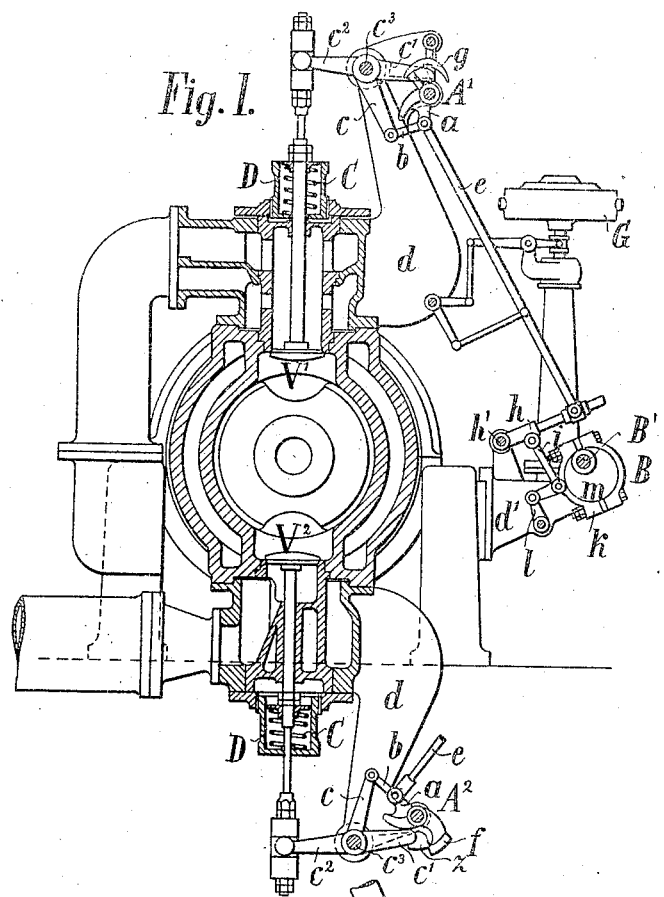
Figure 2:
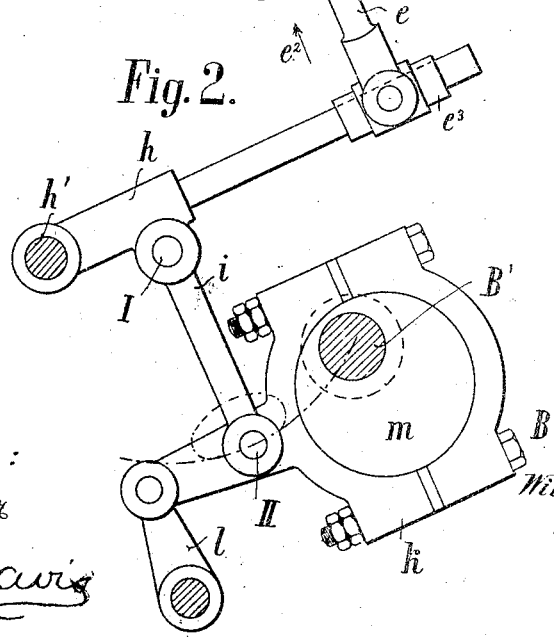
Figure 6:
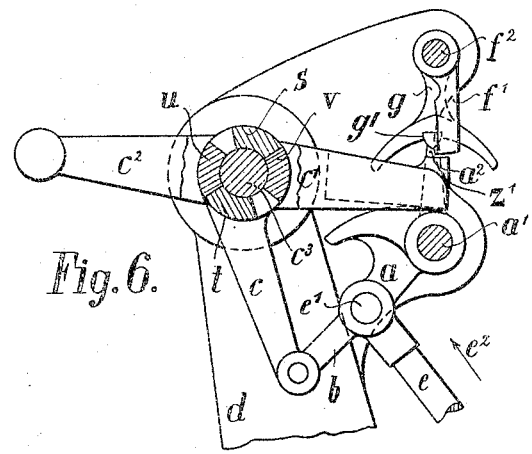

Figure 1 is a cross-section of a gas-engine provided with the improvement. Fig. 2 is an enlarged cross-section of the driving mechanism for the actuating devices for the valves. Fig. 3 is an enlarged cross-section of the actuating device for a valve. Figs. 4 and 5 are similar views of the same, showing the parts in different positions. Fig. 6 is an enlarged cross-section of another actuating device for a valve; and Figs. 7 and 8 are similar views of the same, showing the parts in different positions.

Figure 7:
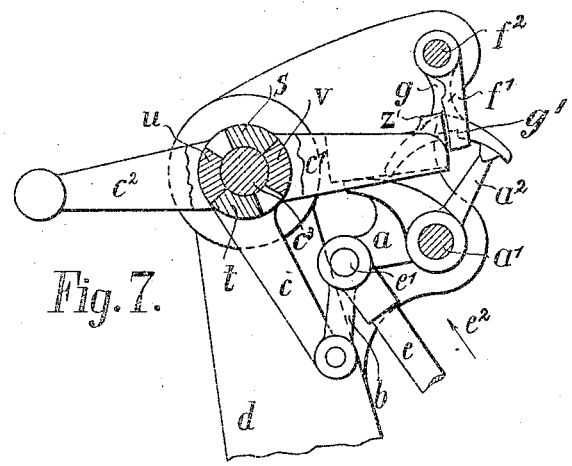
Figure 8:
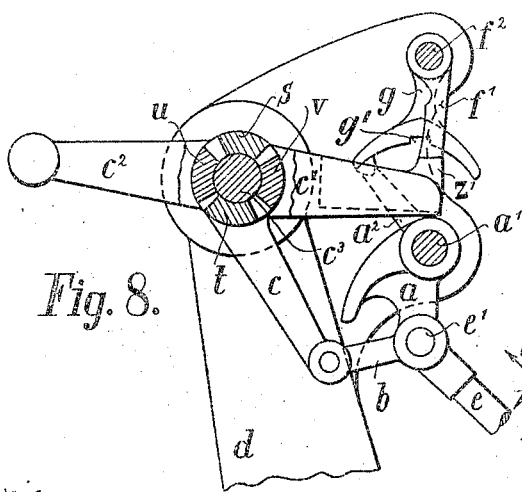

The motor on which the improvement is applied is shown in Fig. 1 as a gas-engine of any approved construction and provided with an inlet-valve $V'$ and an exhaust-valve $V^2$, both valves being positively actuated in both the up and down strokes by valve-actuating devices $A'$ $A^2$, preferably alike in construction, and each of the said actuating devices $A'$ $A^2$ being either of the form shown in Figs. 3, 4, and 5 or as illustrated in Figs. 6, 7, and 8.

In Fig. 1 the actuating device $A'$ is represented as of the construction shown in Figs. 6, 7, and 8, while the device $A^2$ is represented in said Fig. 1 as of the construction shown in Figs. 3, 4, and 5. Both actuating devices $A'$ and $A^2$ are driven from the revolving valve-shaft $B'$ of the engine, it being, however, understood that the actuating device illustrated in Figs. 6, 7, and 8 is driven with less power than the device illustrated in Figs. 3, 4, and 5. As both actuating devices $A'$ and $A^2$ are alike, it is sufficient to describe one of each form mentioned in detail.

In the form shown in Figs. 3, 4, and 5 the valve-stem of the valve $V'$ or $V^2$ is engaged by the arm $c^2$ of a two-armed lever, having its shaft $c^3$ journaled in a suitable bracket $d$, attached to the frame of the engine, and the other arm $c'$ of the said two-armed lever is engaged by a rocking cam $a$, having its shaft $a'$ likewise journaled on the bracket $d$. The cam $a$ is pivotally connected at $e'$ with a link $e$, also connected at $e'$ with a link $b$, pivotally connected with the free end of the arm $c$ of a clutch member mounted to swing loosely on the shaft $c^3$ as a fulcrum. The clutch member is formed on its hub with lugs $s$ and $t$, adapted to engage corresponding lugs $v$ and $u$, formed on the hub of the two-armed lever. On the rocking cam $a$ is secured a segmental lug $f$, adapted to engage a projection $z$, secured or formed on the free end of the arm $c'$ of the two-armed lever, so that when the said segmental lug $f$ engages the projection $z$ then the two-armed lever is held against rocking (see Figs. 3 and 5) at the time the valve $V'$ or $V^2$ is in a closed position.

When the several parts are in the position illustrated in Fig. 3 and the link $e$ is caused to move in the direction of the arrow $e^2$, then a swinging motion is simultaneously given to the rocking cam $a$ and the arm $c$ of the clutch member to move the segmental lug $f$ out of engagement with the projection $z$, and at the same time the rocking cam $a$ imparts a swinging motion to the arm $c'$ of the two-armed lever to cause the other arm $c^2$ thereof to move the valve $V'$ or $V^2$ into an open position, the several parts of the actuating mechanism then assuming the position shown in Fig. 4.

When the link $e$ is caused to move in the inverse direction of the arrow $e^2$, then the clutch member, by its lugs $s$ and $t$, in engagement with the lugs $v$ and $u$, imparts a return swinging motion to the two-armed lever, so that the corresponding valve $V'$ or $V^2$ is moved back to its seat at the time the several parts reach the position shown in Fig. 3, and when this takes place the lug $f$ is moved in engagement with the projection $z$. On a further return movement of the link $e$ in the inverse direction of the arrow $e^2$ the lug $f$ moves still farther in engagement with the projection $z$ to keep the two-armed lever in a locked position; but the surface of the cam $a$ swings away from the corresponding surface of the arm $c'$ of the two-armed lever. The arm $c$ of the clutch member during this movement of the link $e$ swings with its lugs $s$ and $t$ out of engagement with the corresponding lugs $v$ and $u$, (see Fig. 5,) and consequently the two-armed lever is not disturbed by the clutch member until the link $e$ has returned to its former position. (Shown in Fig. 3.)

From the foregoing it will be seen that the continuous forward and return movement of the link $e$, as described, causes an intermittent swinging of the two-armed lever, as described, so that the valve $V'$ or $V^2$ is opened and closed and held closed the desired length of time. It is further understood that the opening of the valve $V'$ or $V^2$ is caused by the rocking action of the cam $a$ and two-armed lever, while the closing of the valve $V'$ or $V^2$ is brought about through the action of the clutch member acting on the two-armed lever formed by the lugs $v$ and $u$.

The locking device for holding the two-armed lever in a locked position during the time mentioned may be of the construction shown in Figs. 6, 7, and 8, it being understood that the remaining portion of the actuating device shown in these figures is the same as above described relative to Figs. 3, 4, and 5. The projection $z'$ on the arm $c'$ of the two-armed lever is adapted to be engaged by a pawl $f'$, fulcrumed at $f^2$ on the bracket $d$, and on the said pawl $f'$ is secured or formed an escapement-lever $g$, engaged by an arm $a^2$, forming part of the rocking cam $a$. When the several parts are in the position shown in Fig. 6, then the arm $a^2$ engages with its free end a notch $g'$ in the middle of the escapement-lever $g$, and at this time the pawl $f'$ is slightly in engagement with the projection $z'$. When the link $e$ moves in the direction of the arrow $e^2$, as previously mentioned, then the arm $a^2$ imparts a quick rocking motion to the escapement-lever $g$ to move the pawl $f'$ out of engagement with the projection $z'$ to allow the two-armed lever to rock for opening the valve $V'$ or $V^2$, as previously explained. (See Fig. 7.) When the several parts return to the position shown in Fig. 6 on the return stroke of the link $e$, then the pawl $f'$ is again in engagement with the projection $z'$, and on the further return stroke of the link $e$ (see Fig. 8) the escapement-lever $g$ is caused to swing in an opposite direction by the arm $a^2$, so that the pawl $f'$ is moved farther into engagement with the projection $z'$ to securely hold the two-armed lever in a locked position for the time being.

In order to impart the desired motion to the link $e$, the said link may form the rod of an eccentric held on the shaft $E'$. In practice I prefer to use a plain eccentric for the link $e$ of the actuating device $A^2$, (shown in Fig. 1;) but for the link $e$ of the actuating device $A'$, I prefer the driving mechanism B. (Illustrated in Figs. 1 and 2.) It is understood that in gas-engines the exhaust-valve $V^2$ necessarily remains open a longer time than the inlet-valve $V'$, and consequently a small eccentric for the actuating device $A^2$ is sufficient for working the exhaust-valve $V^2$.

In order to insure a quicker action of the actuating device $A'$ for keeping the valve $V'$ open but a short time, the driving device B (shown in Figs. 1 and 2) is used. This driving device is arranged as follows: The link $e$ is pivotally connected at its lower end with a sleeve $e^3$, mounted to slide on an arm $h$, fulcrumed at $h'$ on a bracket $d'$, secured on the frame of the engine, and the said arm $h$ is pivotally connected at II by a link $i$ with an eccentric-rod $k$, (at II,) having its disk $m$ secured on the shaft $E'$, the eccentric-rod being pivotally connected with a small rock-arm $l$, fulcrumed on the bracket $d'$. The pivotal connection of the link $i$ with the eccentric-rod $k$ at II is so arranged that during part of a revolution of the eccentric the said pivotal connection at II travels in the arc of a circle, a part of which forms a part of the egg-shaped path of the point II, and consequently the arm $h$ is but intermittently rocked—that is, during part of each revolution the arm $h$ is at a standstill.

In order to give more or less throw to the two-armed lever for opening the valve $V'$ or $V^2$ more or less, it is necessary to slide the sleeve $e^3$ farther out or in on the arm $h$, and for this purpose the link $e$ is pivotally connected by a suitable lever mechanism (shown in Fig. 1) with a governor G of any approved construction to accomplish the desired result. As the double-armed lever is locked in position during the time the valve $V'$ is closed, it is evident that the cam $a$, link $b$, and arm $c$ of the clutch member swing freely without doing any work, and consequently the link $e$ can be freely shifted by the governor G without any back strains from the actuating device $A'$—that is, during the time mentioned the governor G can freely exercise its functions without hindrance on the part of the positive actuating mechanism for the valve $V'$.

In order to store up any momentum acquired by the actuating devices and to utilize this momentum, a tension device is provided which may consist of springs C on the valve-stems and means for regulating the tension thereof, as shown in Fig. 1, or it may be in the shape of a dash-pot.

As shown in the drawings, a spring C surrounds the stem of each of the valves $V'$ $V^2$ within a casing D and between the bottom of the said casing and a collar on the stem. The collar is loose on the stem, and adjusting-nuts are arranged on the stem at one side of the collar, so that the tension of the spring can be increased or decreased, as desired. The spring for the inlet-valve $V'$ is so arranged that it will be compressed when the valve is opened, while the spring for the exhaust-valve V² is compressed when the valve is closed. These springs take up work during the movement of the actuating devices in one direction and do work during the movement of the said actuating devices in the opposite direction.

From the foregoing it is evident that very little power is required for running the valve-gear, and the functioning of the governor is not influenced by reacting forces in the valve-gear.

Having thus described my invention, I claim as new and desire to secure by Letters Patent—

1. A valve-gear for intermittently and positively actuating a valve, comprising a valve-lever connected with the valve, a rocking cam engaging the said valve-lever, for the latter to open the valve, and a clutch member rocking in unison with the said rocking cam, said clutch member being mounted on the pivot of the valve-lever engaging the said valve-lever, to impart a return motion to the same, for closing the valve.

2. A valve-gear for intermittently and positively actuating a valve, comprising a valve-lever connected with the valve, a rocking cam engaging the said valve-lever, for the latter to open the valve, a clutch member rocking in unison with the said rocking cam and arranged for engaging the said valve-lever, to impart a return motion to the same, for closing the valve, and a locking device controlled by the said rocking cam, for engaging the said valve-lever to lock the latter against movement during the return stroke of the rocking cam and the said clutch member.

3. A valve-gear for intermittently and positively actuating a valve, comprising a valve-lever connected with the valve, a rocking cam engaging the said valve-lever, for the latter to open the valve, a clutch member rocking in unison with the said rocking cam and arranged for engaging the said valve-lever, to impart a return motion to the same, for closing the valve, and a locking device controlled by the said rocking cam, for engaging the said valve-lever to lock the latter against movement during the return stroke of the rocking cam and the said clutch member, the said locking device consisting of a projection on the valve-lever and a pawl for engaging the said projection.

4. A valve-gear for intermittently and positively actuating a valve, comprising a valve-lever connected with the valve, a rocking cam engaging the said valve-lever, for the latter to open the valve, a clutch member rocking in unison with the said rocking cam and arranged for engaging the said valve-lever, to impart a return motion to the same, for closing the valve, and a locking device controlled by the said rocking cam, for engaging the said valve-lever to lock the latter against movement during the return stroke of the rocking cam and the said clutch member, the said locking device consisting of a projection on the valve-lever, an arm rocking with the cam-lever, an escapement-lever controlled by the said arm and a pawl moving with the said escapement-lever and adapted to engage the said projection.

5. A valve-gear for intermittently and positively actuating a valve, comprising a valve-lever connected with the valve, a rocking cam engaging the said valve-lever, for the latter to open the valve, a clutch member rocking in unison with the said rocking cam and arranged for engaging the said valve-lever, to impart a return motion to the same, for closing the valve, and an actuating device for the said cam and clutch, consisting of a link connected at one end to the cam and the clutch, a pivoted arm engaged by the other end of the link, an eccentric, a rock-arm connected with the eccentric-rod and a link connecting the said pivoted arm with the eccentric-rod at a point such as II adapted to transfer motion only during one part of the revolution to the pivoted arm.

6. A valve-gear for intermittently and positively actuating a valve, comprising a valve-lever connected with the valve, a rocking cam engaging the said valve-lever, for the latter to open the valve, a clutch member rocking in unison with the said rocking cam and arranged for engaging the said valve-lever, to impart a return motion to the same, for closing the valve, and a tension device for the valve, under tension during a part of the stroke, and to deliver work during another part of the valve-stroke.

7. In a valve-gear, the combination of inlet and exhaust valves, mechanism for operating each valve positively to both open and close it, casings through which the valve-stems project, the casing through which the inlet-valve stem projects having an open outer end and the casing through which the exhaust-valve stem projects having an open inner end, collars on the valve-stem, and springs surrounding the valve-stems between the collars, and the closed ends of the casings, as and for the purpose set forth.

In testimony whereof I have signed my name to this specification in the presence of two subscribing witnesses.

WILHELM HARTMANN.

Witnesses:
JOHANNES HEIM,
WOLDEMAR HAUPT.